United States Patent
Sun et al.

(10) Patent No.: US 11,032,854 B2
(45) Date of Patent: Jun. 8, 2021

(54) VARIABLE PAYLOAD SIZE FOR TWO-STEP RANDOM ACCESS

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Sony Akkarakaran, Poway, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/745,052

(22) Filed: Jan. 16, 2020

(65) Prior Publication Data
US 2020/0236717 A1 Jul. 23, 2020

Related U.S. Application Data

(60) Provisional application No. 62/794,383, filed on Jan. 18, 2019.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 1/0038* (2013.01); *H04L 5/0044* (2013.01); *H04W 72/0413* (2013.01)

(58) Field of Classification Search
CPC .......... H04W 74/0833; H04W 72/0413; H04L 1/0038; H04L 5/0044
See application file for complete search history.

(56) References Cited

U.S. PATENT DOCUMENTS 8,547,949 B2    10/2013  Fischer et al.
10,903,886 B2 *  1/2021  Faxer ................... H04B 7/0632
(Continued)

FOREIGN PATENT DOCUMENTS

WO    2018064372 A1    4/2018

OTHER PUBLICATIONS

Qualcomm Incorporated: "Physical Layer Aspects of early Data Transmission", 3GPP TSG RAN WG1 Meeting #92, R1-1802325, Athens, Greece, Feb. 26-Mar. 2, 2018, 6 pages.
(Continued)

*Primary Examiner* — Jay P Patel
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information for a two-step random access channel (RACH) procedure, wherein the configuration information identifies a plurality of physical uplink shared channel (PUSCH) configurations for a PUSCH of the two-step RACH procedure; and transmit the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration. Numerous other aspects are provided.

30 Claims, 8 Drawing Sheets

(51) Int. Cl.
*H04L 1/00* (2006.01)
*H04W 72/04* (2009.01)

(56) References Cited

U.S. PATENT DOCUMENTS

| | | | | |
|---|---|---|---|---|
| 2009/0109919 | A1* | 4/2009 | Bertrand | H04W 74/0883 370/330 |
| 2010/0303039 | A1* | 12/2010 | Zhang | H04B 7/024 370/331 |
| 2013/0083747 | A1* | 4/2013 | Narasimha | H04W 74/0841 370/329 |
| 2013/0279486 | A1* | 10/2013 | Kato | H04W 56/0005 370/336 |
| 2014/0219255 | A1* | 8/2014 | Eyuboglu | H04L 1/0036 370/336 |
| 2015/0023281 | A1* | 1/2015 | Wu | H04W 72/0473 370/329 |
| 2015/0045038 | A1* | 2/2015 | Gao | H04W 36/22 455/438 |
| 2015/0289292 | A1 | 10/2015 | Sun et al. | |
| 2016/0270058 | A1* | 9/2016 | Furuskog | H04L 1/0006 |
| 2017/0019930 | A1* | 1/2017 | Lee | H04W 72/0413 |
| 2018/0084578 | A1* | 3/2018 | Kato | H04W 74/008 |
| 2018/0132260 | A1* | 5/2018 | Harada | H04W 72/1226 |
| 2018/0139787 | A1* | 5/2018 | Islam | H04L 5/0053 |
| 2018/0205516 | A1 | 7/2018 | Jung et al. | |
| 2018/0213571 | A1* | 7/2018 | Wang | H04W 74/0808 |
| 2018/0220450 | A1* | 8/2018 | Aiba | H04W 74/004 |
| 2018/0279376 | A1* | 9/2018 | Dinan | H04W 74/0833 |
| 2018/0324850 | A1* | 11/2018 | Amuru | H04L 5/0053 |
| 2018/0368188 | A1* | 12/2018 | Aiba | H04W 74/0833 |
| 2019/0132882 | A1* | 5/2019 | Li | H04W 74/0833 |
| 2019/0174553 | A1* | 6/2019 | Tavares | H04L 27/26 |
| 2019/0199420 | A1* | 6/2019 | Faxer | H04B 7/0639 |
| 2019/0320469 | A1* | 10/2019 | Huang | H04L 5/0053 |
| 2019/0357092 | A1* | 11/2019 | Jung | H04W 74/0833 |
| 2019/0363843 | A1* | 11/2019 | Gordaychik | H04L 1/0013 |
| 2019/0373642 | A1* | 12/2019 | Suzuki | H04W 80/08 |
| 2020/0029283 | A1* | 1/2020 | Lei | H04L 5/0048 |
| 2020/0045650 | A1* | 2/2020 | Suzuki | H04W 76/11 |
| 2020/0045742 | A1* | 2/2020 | Suzuki | H04W 80/08 |
| 2020/0053789 | A1* | 2/2020 | Lee | H04L 5/00 |
| 2020/0100297 | A1* | 3/2020 | Agiwal | H04L 5/0048 |
| 2020/0112994 | A1* | 4/2020 | Zhang | H04L 27/2649 |
| 2020/0146054 | A1* | 5/2020 | Jeon | H04L 5/0053 |
| 2020/0146055 | A1* | 5/2020 | Lei | H04L 5/0091 |
| 2020/0146059 | A1* | 5/2020 | Cirik | H04W 74/006 |
| 2020/0187246 | A1* | 6/2020 | Amuru | H04J 11/0076 |
| 2020/0252977 | A1* | 8/2020 | Zhang | H04L 5/0048 |
| 2020/0404708 | A1* | 12/2020 | Zhang | H04W 16/14 |

OTHER PUBLICATIONS

Samsung: "NR 2-Step Random Access Procedure", 3GPP TSG RAN WG1 NR Ad Hoc, R1-1700892, Spokane, Washington, USA, Jan. 16-20, 2017, 5 pages.
International Search Report and Written Opinion—PCT/US2020/013984—ISA/EPO—dated Apr. 15, 2020.
Nokia, et al., "On 2-step Random Access Procedure", 3GPP Draft, 3GPP TSG RAN WG1 Ad-Hoc Meeting 1901, R1-1901192 On 2-step Random Access Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, 20190121-20190125, Jan. 11, 2019 (Jan. 11, 2019), XP051576722, 7 Pages, Retrieved from the Internet: URL: http://www.3gpp.org/ftp/tsg%5Fran/WG1%5FRL1/TSGR1%5FAH/NR%5FAH%5F1901/Docs/R1%2D1901192%2Ezip.

* cited by examiner

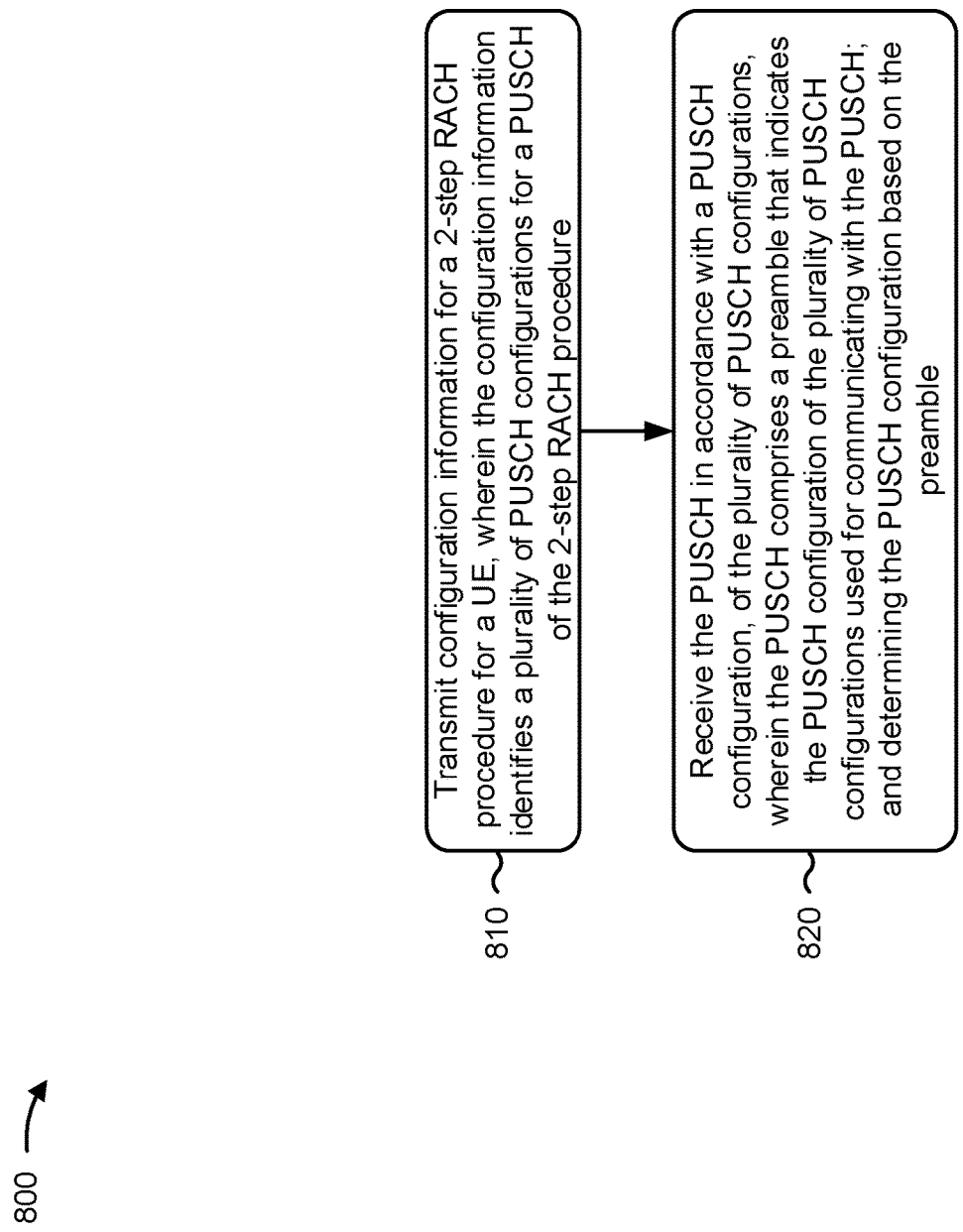

VARIABLE PAYLOAD SIZE FOR TWO-STEP RANDOM ACCESS

CROSS-REFERENCE TO RELATED APPLICATION

This Patent Application claims priority to U.S. Provisional Patent Application No. 62/794,383, filed on Jan. 18, 2019, entitled "VARIABLE PAYLOAD SIZE FOR TWO-STEP RANDOM ACCESS," and assigned to the assignee hereof. The disclosure of the prior Application is considered part of and is incorporated by reference in this Patent Application.

FIELD OF THE DISCLOSURE

Aspects of the present disclosure generally relate to wireless communication, and more particularly to techniques and apparatuses for variable payload size for two-step random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like. A gNB is a logical 5G radio node.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information for a two-step random access channel (RACH) procedure, wherein the configuration information identifies a plurality of configurations for an uplink RACH message of the two-step RACH procedure; and transmitting the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a UE for wireless communication may include memory and one or more processors operatively coupled to the memory. The memory and the one or more processors may be configured to receive configuration information for a two-step RACH procedure, wherein the configuration information identifies a plurality of configurations for an uplink RACH message of the two-step RACH procedure; and transmit the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a non-transitory computer-readable medium may store one or more instructions for wireless communication. The one or more instructions, when executed by one or more processors of a UE, may cause the one or more processors to receive configuration information for a two-step RACH procedure, wherein the configuration information identifies a plurality of configurations for an uplink RACH message of the two-step RACH procedure; and transmit the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, an apparatus for wireless communication may include means for receiving configuration information for a two-step RACH procedure, wherein the configuration information identifies a plurality of configurations for an uplink RACH message of the two-step RACH procedure; and means for transmitting the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a method of wireless communication, performed by a base station, may include transmitting configuration information for a two-step RACH procedure for a UE, wherein the configuration information identifies a plurality of configurations for an uplink RACH message of the two-step RACH procedure; and receiving the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a base station for wireless communication may include memory and one or more processors operatively coupled to the memory. The memory and the one or more processors may be configured to transmit configuration information for a two-step RACH procedure for a UE, wherein the configuration information identifies a plurality of configurations for an uplink RACH message of the two-step RACH procedure; and receive the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a non-transitory computer-readable medium may store one or more instructions for wireless communication. The one or more instructions, when executed by one or more processors of a base station, may cause the one or more processors to transmit configuration information for a two-step RACH procedure for a UE, wherein the configuration information identifies a plurality of configurations for an uplink RACH message of the two-step RACH procedure; and receive the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, an apparatus for wireless communication may include means for transmitting configuration information for a two-step RACH procedure for a UE, wherein the configuration information identifies a plurality of configurations for an uplink RACH message of the two-step RACH procedure; and means for receiving the uplink RACH message in accordance with a configuration, of the plurality of configurations, wherein the configuration is selected based at least in part on a size of a payload of the uplink RACH message, and wherein a preamble of the uplink RACH message is used to determine the configuration.

In some aspects, a method of wireless communication, performed by a UE, may include receiving configuration information for a two-step RACH procedure, wherein the configuration information identifies a plurality of physical uplink shared channel (PUSCH) configurations for a PUSCH of the two-step RACH procedure; and transmitting the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration.

In some aspects, a UE for wireless communication may include memory and one or more processors operatively coupled to the memory. The memory and the one or more processors may be configured to receive configuration information for a two-step RACH procedure, wherein the configuration information identifies a plurality of PUSCH configurations for a PUSCH of the two-step RACH procedure; and transmit the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration.

In some aspects, a non-transitory computer-readable medium may store one or more instructions for wireless communication. The one or more instructions, when executed by one or more processors of a UE, may cause the one or more processors to receive configuration information for a two-step RACH procedure, wherein the configuration information identifies a plurality of PUSCH configurations for a PUSCH of the two-step RACH procedure; and transmit the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration.

In some aspects, an apparatus for wireless communication may include means for receiving configuration information for a two-step RACH procedure, wherein the configuration information identifies a plurality of PUSCH configurations for a PUSCH of the two-step RACH procedure; and means for transmitting the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration.

In some aspects, a method of wireless communication, performed by a base station, may include transmitting configuration information for a two-step RACH procedure for a UE, wherein the configuration information identifies a plurality of PUSCH configurations for a PUSCH of the two-step RACH procedure; receiving the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and determining the PUSCH configuration based on the preamble.

In some aspects, a base station for wireless communication may include memory and one or more processors operatively coupled to the memory. The memory and the one or more processors may be configured to transmit configuration information for a two-step RACH procedure for a UE, wherein the configuration information identifies a plurality of PUSCH configurations for a PUSCH of the two-step RACH procedure; and receive the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and to determine the PUSCH configuration based on the preamble.

In some aspects, a non-transitory computer-readable medium may store one or more instructions for wireless communication. The one or more instructions, when executed by one or more processors of a base station, may cause the one or more processors to transmit configuration information for a two-step RACH procedure for a UE, wherein the configuration information identifies a plurality of PUSCH configurations for a PUSCH of the two-step RACH procedure; and receive the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and to determine the PUSCH configuration based on the preamble.

In some aspects, an apparatus for wireless communication may include means for transmitting configuration information for a two-step RACH procedure for a UE, wherein the configuration information identifies a plurality of PUSCH configurations for a PUSCH of the two-step RACH procedure; and means for receiving the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and to determine the PUSCH configuration based on the preamble.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
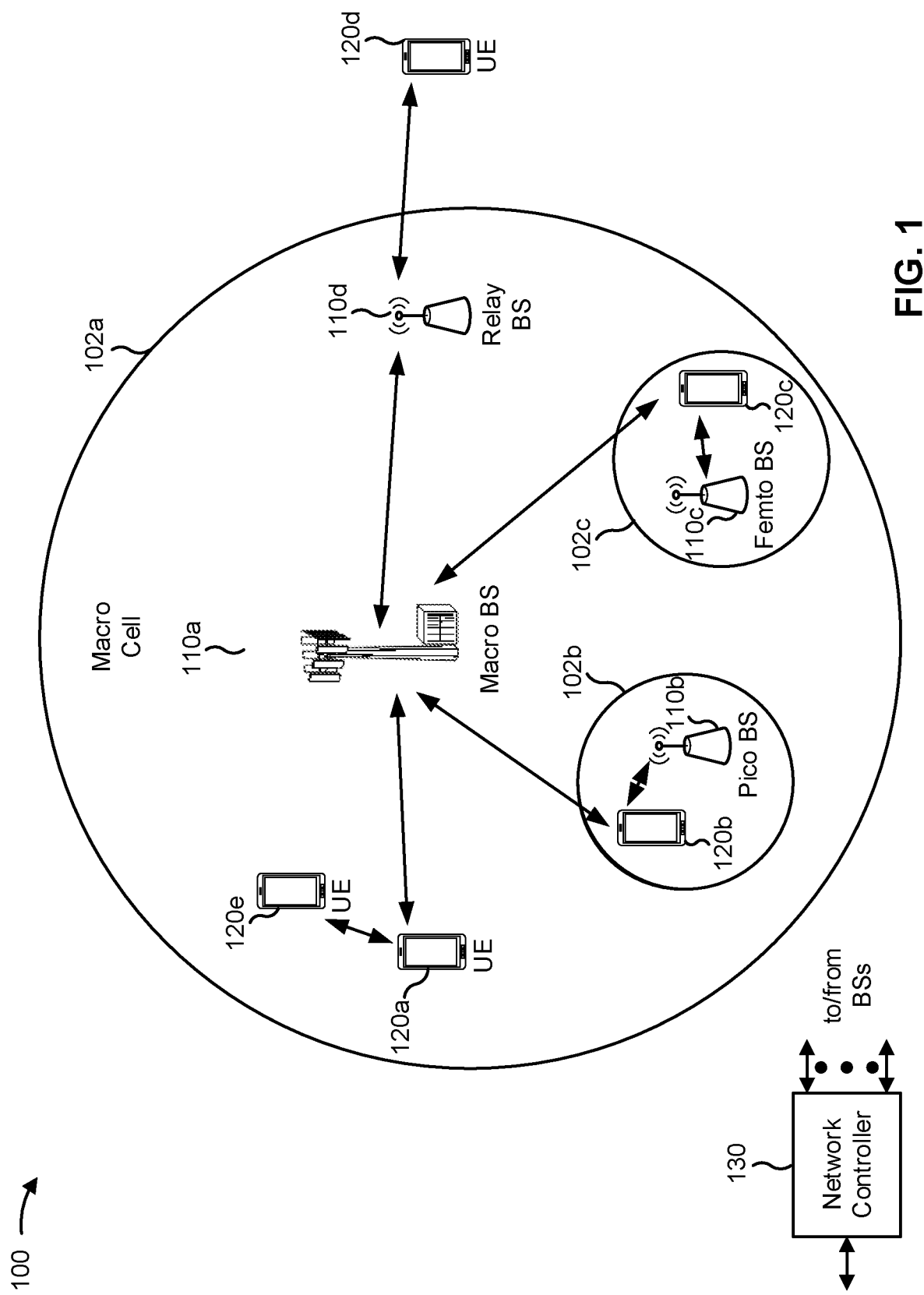
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
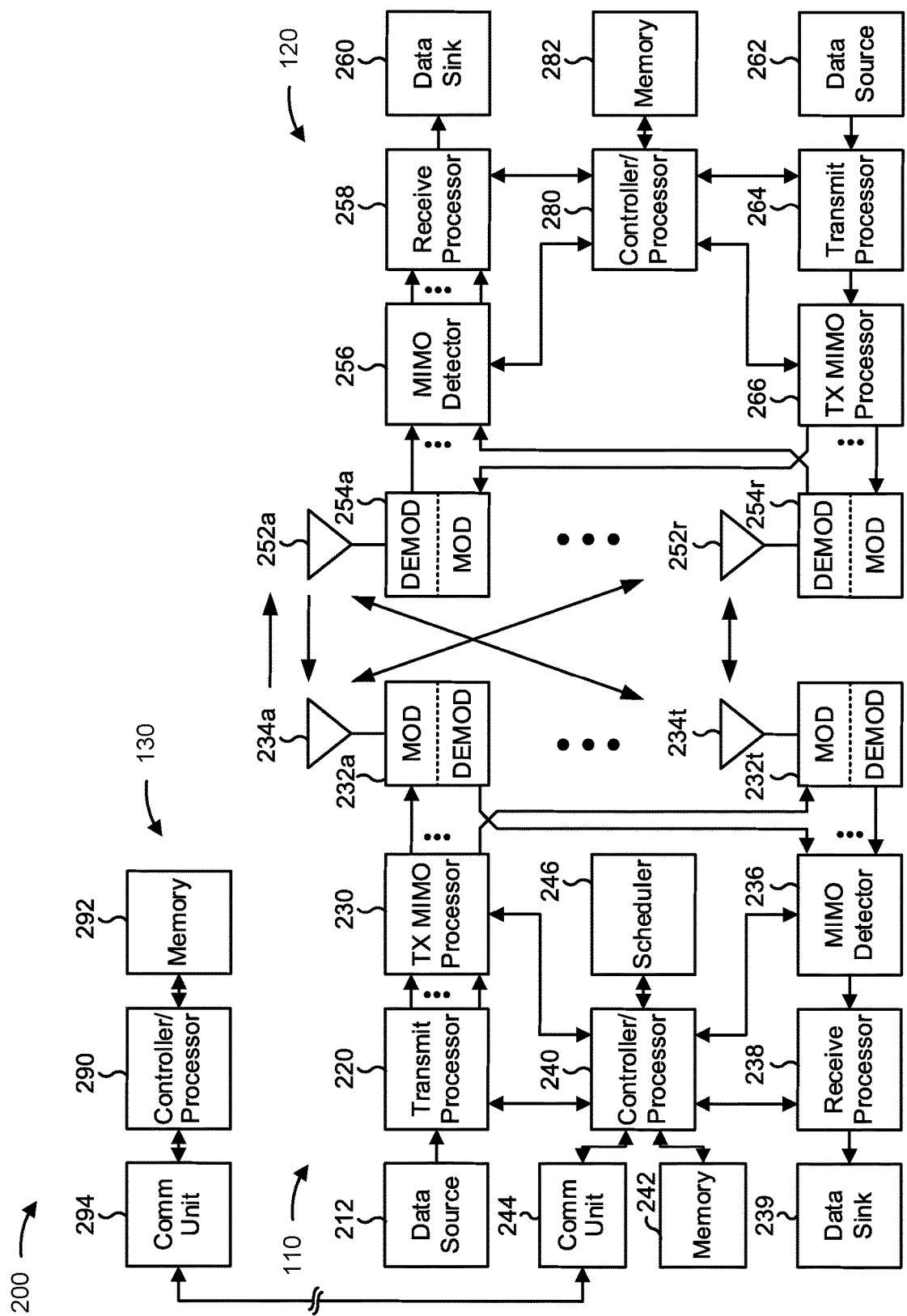
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling for variable payload size for two-step random access, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving configuration information for a two-step random access channel (RACH) procedure, wherein the configuration information identifies a plurality of physical uplink shared channel (PUSCH) configurations for a PUSCH of the two-step RACH procedure; means for transmitting the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration; means for transmitting the PUSCH using a particular RACH occasion for the preamble of the PUSCH, wherein the particular RACH occasion indicates the size of the payload or a PUSCH configuration of the payload; and/or the like. In some aspects, such means may include one or more components of UE 120 described in connection with FIG. 2. In this way, a base station that receives the PUSCH is able to determine the selected PUSCH configuration based on the information comprised in the preamble.

In some aspects, base station 110 may include means for transmitting configuration information for a two-step RACH procedure for a UE, wherein the configuration information identifies a plurality of PUSCH configurations for a PUSCH of the two-step RACH procedure; means for receiving the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and means for determining the PUSCH configuration based on the preamble; means for receiving the PUSCH in a particular RACH occasion, wherein the particular RACH occasion indicates the size of the payload or a PUSCH configuration of the payload; means for performing blind decoding in accordance with the set of blind decoding hypotheses to receive the payload of the PUSCH; and/or the like. In some aspects, such means may include one or more components of base station 110 described in connection with FIG. 2.

As indicated above, FIG. 2 is provided as an example. Other examples may differ from what is described with regard to FIG. 2.

A two-step random access channel (RACH) procedure may reduce delay and conserve communications in comparison to a four-step RACH procedure. Thus, the two-step RACH procedure may be particularly useful for low-throughput applications, such as industrial Internet of Things (I-IoT) and/or the like. The two-step RACH procedure may include an uplink RACH message and a downlink RACH message. The uplink RACH message may include the content of four-step RACH messages 1 and 3 (e.g., the physical RACH (PRACH) preamble and the payload or PUSCH) and the downlink RACH message may include the content of four-step RACH messages 2 and 4 (e.g., a random access response and a contention resolution, such as a downlink control channel or a downlink shared channel). The uplink RACH message may be transmitted on a RACH occasion, which may be a resource allocation for the uplink RACH message. The preamble may be selected from a set of possible preambles, and may be based at least in part on the RACH occasion. In some cases, the uplink RACH message may be referred to as RACH message A and the downlink RACH message may be referred to as RACH message B.

Two-step RACH may be useful for transmitting a small data payload to the base station without a time- and resource-intensive four-step RACH connection setup, followed by an uplink grant and data transmission. The packet size of the uplink RACH message may be variable based at least in part on the application. In some cases, the packet size may be fixed and/or known. However, in other cases, such as when connectionless data transmission is supported, the packet size may be more dynamic. One approach is for the base station to support a single RACH payload size and pad out smaller payloads with zeroes or a different value, but this may be wasteful of signaling and processing resources.

Some techniques and apparatuses described herein provide for the configuration of multiple, different payload resource sets (e.g., multiple, different physical uplink shared channel (PUSCH) configurations) to handle different payload sizes for an uplink RACH message, such as for a PUSCH of the uplink RACH message. The UE may select an appropriate PUSCH configuration based at least in part on the payload size that the UE is to transmit. The UE may provide an indication of the selected PUSCH configuration based at least in part on a preamble selected for the uplink RACH message, a RACH occasion for the uplink RACH message, a demodulation reference signal of the uplink RACH message, and/or the like. The base station may receive (e.g., demodulate, decode, detect) the uplink RACH message based at least in part on the indication and in accordance with the PUSCH configuration. In this way, the base station may support multiple, different payload sizes for a two-step RACH message, thereby improving flexibility of the two-step RACH procedure. Furthermore, supporting different payload sizes may reduce signaling between the base station and the UE in connection with indicating payload size using a standalone message, providing uplink grants, performing a four-step RACH procedure, and/or the like.

Figure 3:
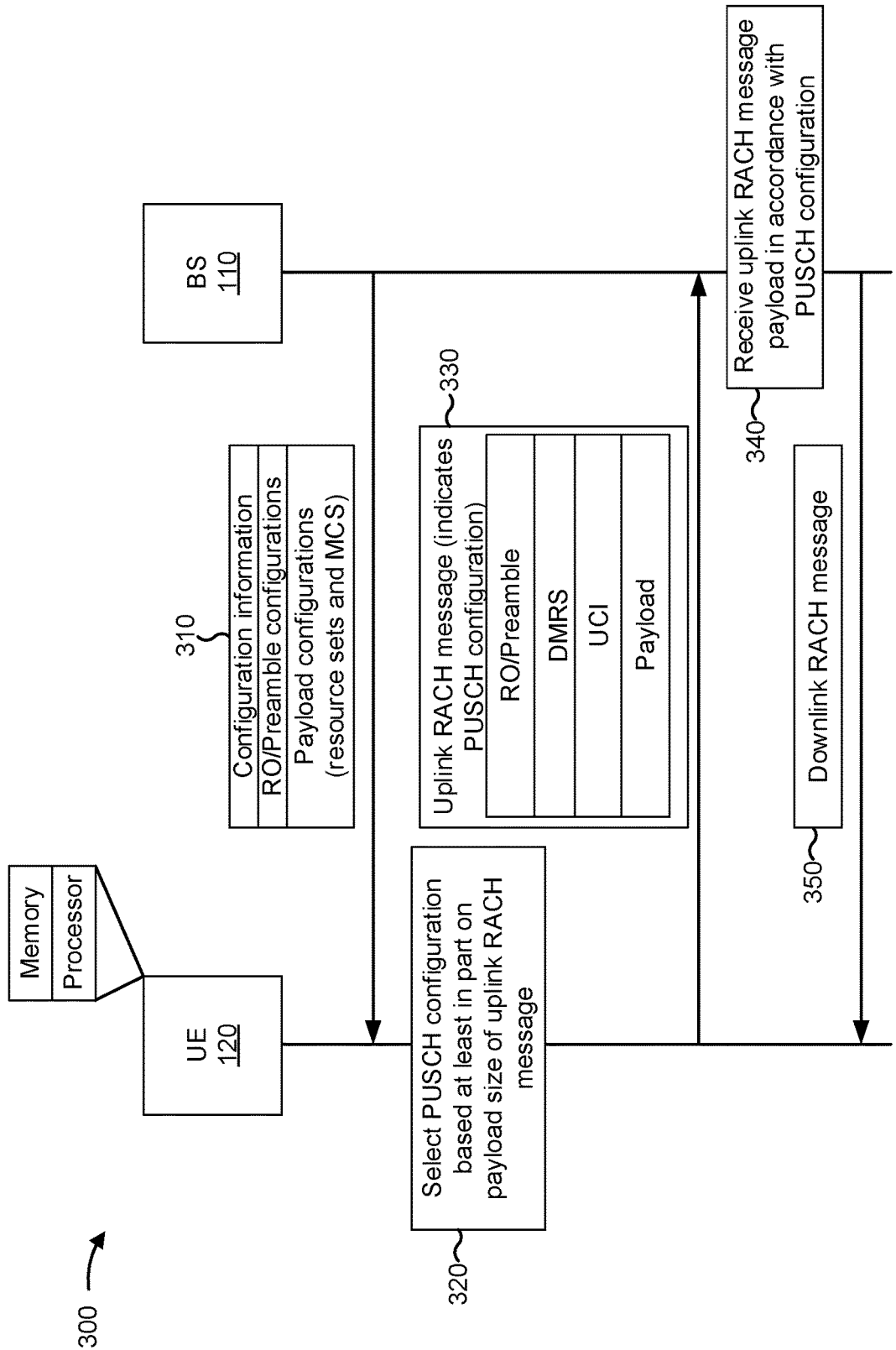
FIG. 3 is a diagram illustrating an example of signaling for variable payload size in a two-step random access channel (RACH) procedure, in accordance with various aspects of the present disclosure.

FIG. 3 is a diagram illustrating an example 300 of signaling for variable payload size in a two-step RACH procedure, in accordance with various aspects of the present disclosure. As shown, example 300 includes a UE 120 and a BS 110. As further shown, the UE 120 includes a memory and a processor. The memory may comprise a non-transitory computer-readable medium, such as memory 282. The processor may comprise one or more processors, such as controller/processor 280, transmit processor 264, or receive processor 258. The memory may store one or more instructions for wireless communication that, when executed by the processor of the UE 120, cause the processor to perform the operations described in connection with FIG. 3, below.

As shown in FIG. 3, and by reference number 310, the UE 120 may receive, from the BS 110, configuration information. In some aspects, the UE 120 may receive the configuration information from another BS 110 other than the BS 110 associated with the two-step RACH procedure. The configuration information may identify a plurality of configurations for an uplink RACH message of the two-step RACH process. For example, and as shown, the configuration information may identify configurations for RACH occasions and/or preambles of the uplink RACH message, and may identify configurations for payloads (e.g., PUSCH configurations) of the uplink RACH message. The PUSCH configurations may identify resource allocations, starting symbols, ending symbols, modulation and coding schemes, blind decoding candidates, and/or the like, for the payload (e.g., the PUSCH) of the uplink RACH message.

In some aspects, the configuration information may identify mappings between parts of the uplink RACH message. For example, in accordance with a first option (e.g., Option 1) the configuration information may identify a mapping between a particular RACH occasion (RO) or a particular set of preambles (e.g., a particular preamble group) and a particular PUSCH configuration, as described in more detail in connection with FIG. 4. As another example, in accordance with a second option (e.g., Option 2), the configuration information may identify a mapping between a particular RO or a particular set of preambles (e.g., a particular preamble group) and a set of blind decoding candidates for a payload, as described in more detail in connection with FIG. 5. As yet another example, in accordance with a third option (e.g., Option 3), the configuration information may identify a mapping between a demodulation reference signal (DMRS) scrambling sequence or a code rate and a blind decoding candidate, as described in more detail in connection with FIG. 6. In some aspects, the configuration information may be based at least in part on a combination of two or more of the above options.

As shown by reference number 320, the UE 120 may select a PUSCH configuration, of the plurality of PUSCH configurations, based at least in part on a payload size of an uplink RACH message (e.g., a PUSCH) to be transmitted by the UE 120. For example, the UE 120 may determine the payload size, and may select a PUSCH configuration for the uplink RACH message based at least in part on the payload size. In some aspects, the UE 120 may select the payload size so that a resource allocation and/or a modulation and coding scheme (MCS) of the PUSCH is sufficient to provide the payload in the uplink RACH message.

As shown by reference number 330, the UE 120 may provide the uplink RACH message in accordance with the PUSCH configuration. As further shown, the uplink RACH message may indicate the PUSCH configuration. As shown, the uplink RACH message may be transmitted on a particular RACH occasion and may be associated with a preamble. Furthermore, the uplink RACH message may include a DMRS, uplink control information (UCI), and/or a payload (e.g., a PUSCH). In some aspects, the UCI may be piggybacked on the payload.

As mentioned above, the uplink RACH message may indicate the PUSCH configuration. In some aspects, the RO and/or the preamble may indicate the PUSCH configuration. For example, the RO and/or the preamble may be mapped to a particular PUSCH configuration of the payload. In some aspects, the RO and/or the preamble may indicate a PUSCH configuration associated with a set of blind decoding candidates for the payload. For example, the RO and/or the preamble may indicate the set of blind decoding candidates, and the BS 110 may perform blind decoding based at least in part on the set of blind decoding candidates to identify the payload. As another example, the RO and/or the preamble may indicate the set of blind decoding candidates, and the UCI and/or the DMRS of the uplink RACH message may indicate a code rate and/or payload size corresponding to a particular blind decoding candidate of the set of blind decoding candidates. The BS 110 may decode the particular blind decoding candidate accordingly.

The payload may include any information that can be provided using a PUSCH of an uplink RACH message. Possible examples include a media access control subheader, a radio resource control setup request, a radio resource control resume request, a media access control control element, a radio resource control system information request, and/or the like. In some aspects, the uplink RACH message may relate to an initial access procedure from an idle mode, a radio resource control connection reestablishment procedure, a transition from a radio resource control inactive state, a beam failure recovery procedure, a request for other system information, a handover, and/or the like.

As shown by reference number 340, the BS 110 may receive (e.g., demodulate, detect, decode, etc.) the uplink RACH message payload (e.g., the PUSCH) in accordance with the PUSCH configuration. For example, the BS 110 may determine the PUSCH configuration using the uplink RACH message (e.g., the preamble, the RO, the DMRS, the UCI, and/or the like), and may receive the payload in accordance with the PUSCH configuration. In some aspects, the BS 110 may perform blind decoding or detection based at least in part on the PUSCH configuration. For example, the BS 110 may perform blind decoding or detection based at least in part on a set of hypotheses indicated by the uplink RACH message. In some aspects, the BS 110 may demodulate or decode the payload based at least in part on a coding rate or a size of the payload. For example, in the case when the DMRS or the UCI indicates the coding rate or the size, the BS 110 may identify a resource allocation of the payload based at least in part on the coding rate or the size, and may decode the uplink RACH message based at least in part on the resource allocation, the coding rate, and/or the size. In this way, the BS 110 may identify a PUSCH configuration for the uplink RACH message without additional signaling to indicate the PUSCH configuration, thereby conserving signaling resources of the BS 110 and the UE 120. Furthermore, by indicating the PUSCH configuration and, therefore, the size of the payload, resources of the BS 110 and the UE 120 that would otherwise be used to generate and/or receive a padded payload may be conserved.

As shown by reference number 350, the BS 110 may provide a downlink RACH message based at least in part on the uplink RACH message. For example, the downlink RACH message may include a random access response, a media access control (MAC) control element (CE) for contention resolution, and/or the like.

As indicated above, FIG. 3 is provided as an example. Other examples may differ from what is described with respect to FIG. 3.

Figure 4:
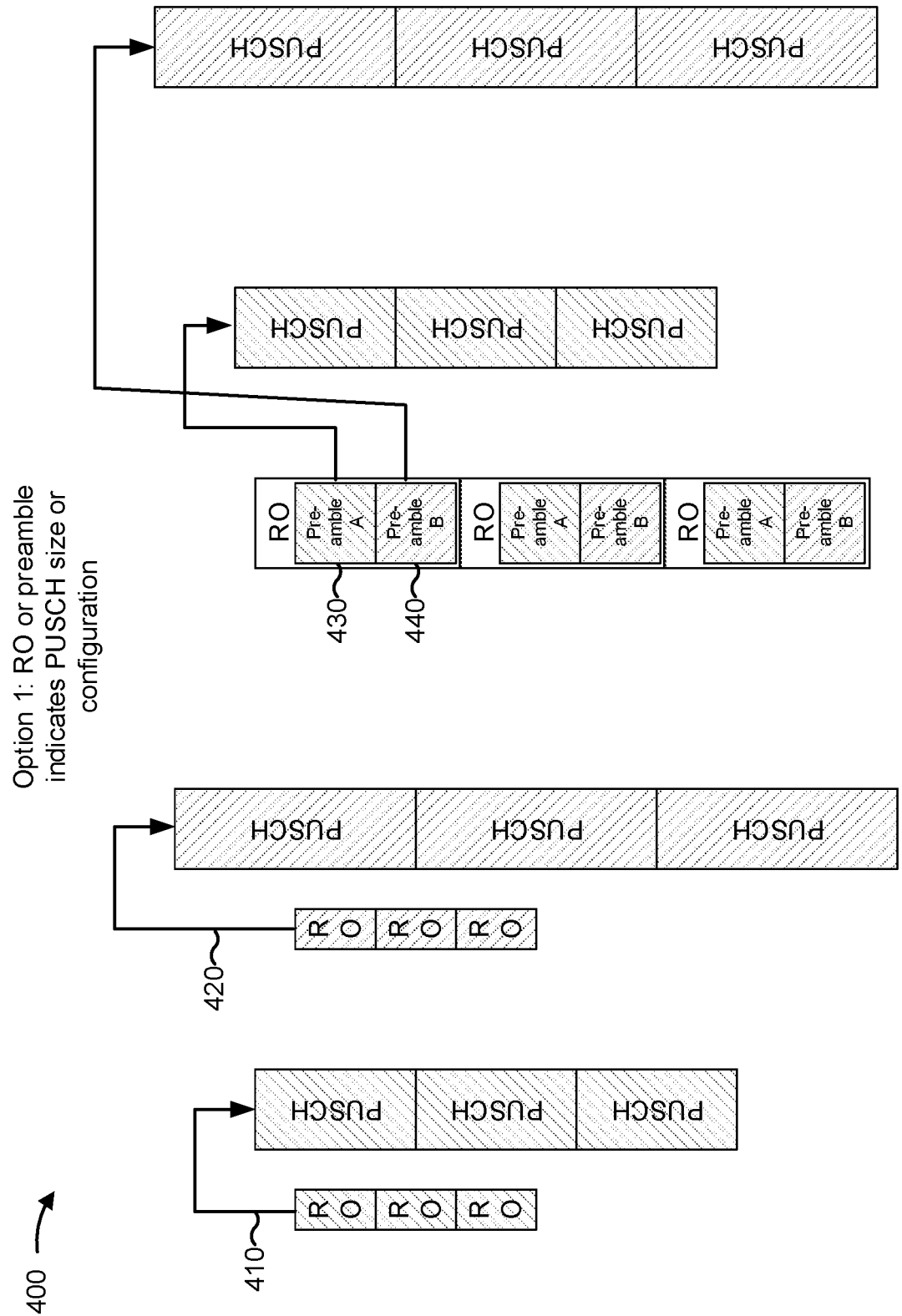
FIG. 4 is a diagram illustrating an example of signaling for variable payload size in a two-step RACH procedure, in accordance with various aspects of the present disclosure.

FIG. 4 is a diagram illustrating an example 400 of signaling for variable payload size in a two-step RACH procedure, in accordance with various aspects of the present disclosure. Example 400 depicts a first option (e.g., Option 1) for indication of the PUSCH configuration of an uplink RACH message. In example 400, various RACH occasions (ROs) are mapped to PUSCH configurations for corresponding payloads (e.g., PUSCHs). For example, in example 400, an RO with a bottom-left-to-top-right hatch may correspond to a payload with the same hatch, and an RO with a top-left-to-bottom-right hatch may correspond to a payload with the same hatch.

Reference numbers 410 and 420 illustrate a case wherein different ROs (e.g., PRACH resources) correspond to respective payload sizes. For example, reference number 410 illustrates a first set of ROs corresponding to a set of payloads of a first size, and reference number 420 illustrates a second set of ROs corresponding to a set of payloads of a second size. When the UE 120 transmits an uplink RACH message with a preamble in the first set of ROs, the BS 110 may identify a payload of the set of payloads of the first size, and may decode the payload accordingly. When the UE 120 transmits an uplink RACH message with a preamble in the second set of ROs, the BS 110 may identify a payload of the set of payloads of the second size, and may decode the payload accordingly. Thus, the RO may be used to indicate which payload and/or payload size is to be used. In this case, the configuration information may include multiple two-step RACH configurations that collectively identify time and/or frequency (time/frequency) resources of the preambles (e.g., the ROs) and time/frequency resources of each payload.

Reference numbers 430 and 440 illustrate a case wherein different sets of preambles of an RO correspond to different payload sizes. "Set of preambles" may be used interchangeably with "group of preambles" and/or "preamble group" herein. As shown by reference number 430, a preamble of a first set of preambles (e.g., Preamble A) may correspond to a payload of a first size. As shown by reference number 440, a preamble of a second set of preambles (e.g., Preamble B) may correspond to a payload of a second size. In this example, a preamble of the topmost RO and the first set of preambles may indicate a topmost payload of the first size, a preamble of the topmost RO and the second set of preambles may indicate a topmost payload of the second size, and so on. In some aspects, a set of preambles may include one or more preambles, up to a maximum number of preambles of an RO that includes the set of preambles. In this case, the configuration information may include a single two-step RACH configuration that identifies time/frequency resources of each payload and an association of sets of preamble sequences and ROs.

As indicated above, FIG. 4 is provided as an example. Other examples may differ from what is described with respect to FIG. 4.

Figure 5:
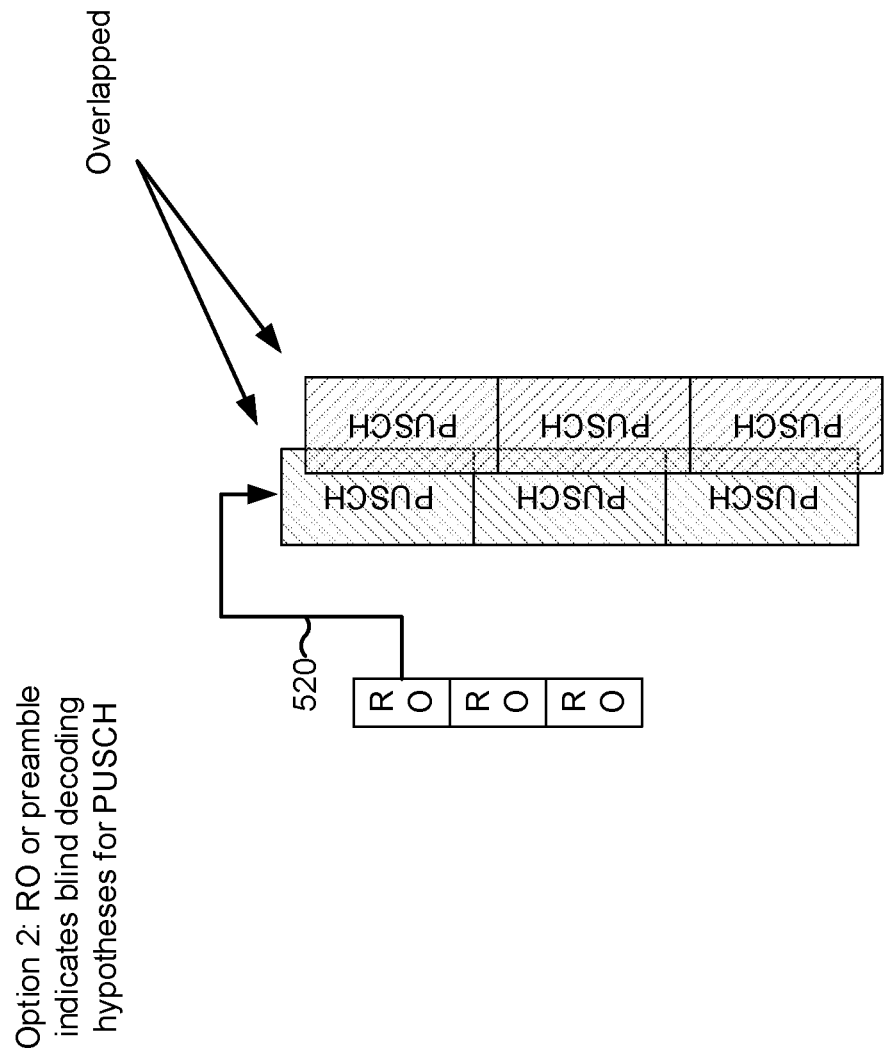
FIG. 5 is a diagram illustrating an example of signaling for variable payload size in a two-step RACH procedure, in accordance with various aspects of the present disclosure.
Figure 5:
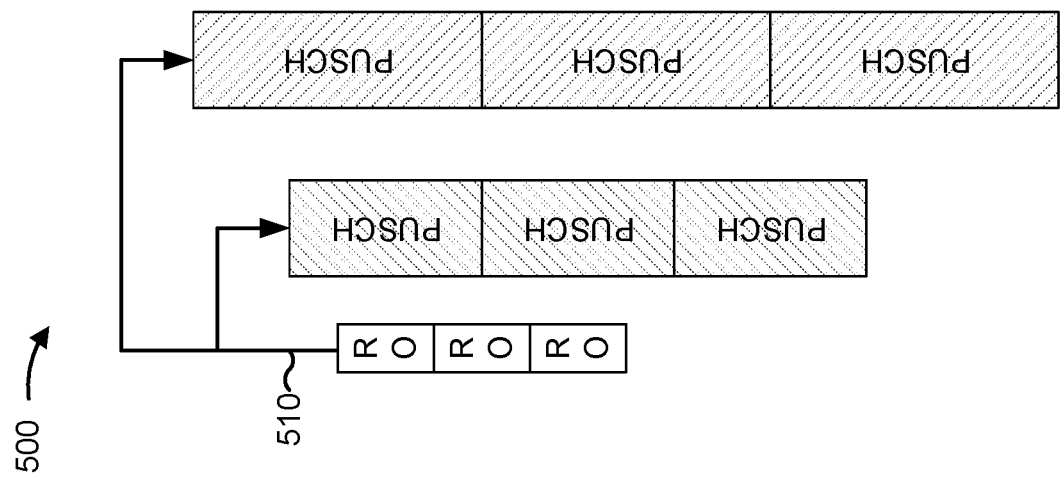

FIG. 5 is a diagram illustrating an example 500 of signaling for variable payload size in a two-step RACH procedure, in accordance with various aspects of the present disclosure. Example 500 depicts a second option (e.g., Option 2) for indication of the PUSCH configuration of an uplink RACH message. In example 500, various ROs and/or preambles are mapped to sets of blind decoding hypotheses for a payload. For example, as shown by reference number 510, a particular RO (and/or a preamble included in the particular RO) may be mapped to a set of blind decoding hypotheses (e.g., resource allocations, starting symbols, ending symbols, MCSs, and/or the like) for payloads of one or more different sizes. In the example shown by reference number 510, the blind decoding hypotheses do not overlap each other, which allows for payloads of different resource allocation sizes and is thus more practicable for low-complexity UEs that are not capable of using more sophisticated MCSs.

As shown by reference number 520, a particular RO (and/or a preamble included in the particular RO) may be mapped to a set of blind decoding hypotheses that overlap each other. Here, the left column of payloads occupy a same set of resources as the right column of payloads, despite the right column of payloads being associated with a larger payload size. This may be accomplished by using a higher coding rate for the payloads associated with the larger payload size. In this case, the BS 110 may perform blind decoding of the blind decoding hypotheses using various MCS values. By using overlapped resource allocations (e.g., time/frequency resources), DMRS channel estimation may be shared for the blind decoding hypotheses, thereby conserving channel estimation resources of the UE 120 and/or the BS 110.

As indicated above, FIG. 5 is provided as an example. Other examples may differ from what is described with respect to FIG. 5.

Figure 6:
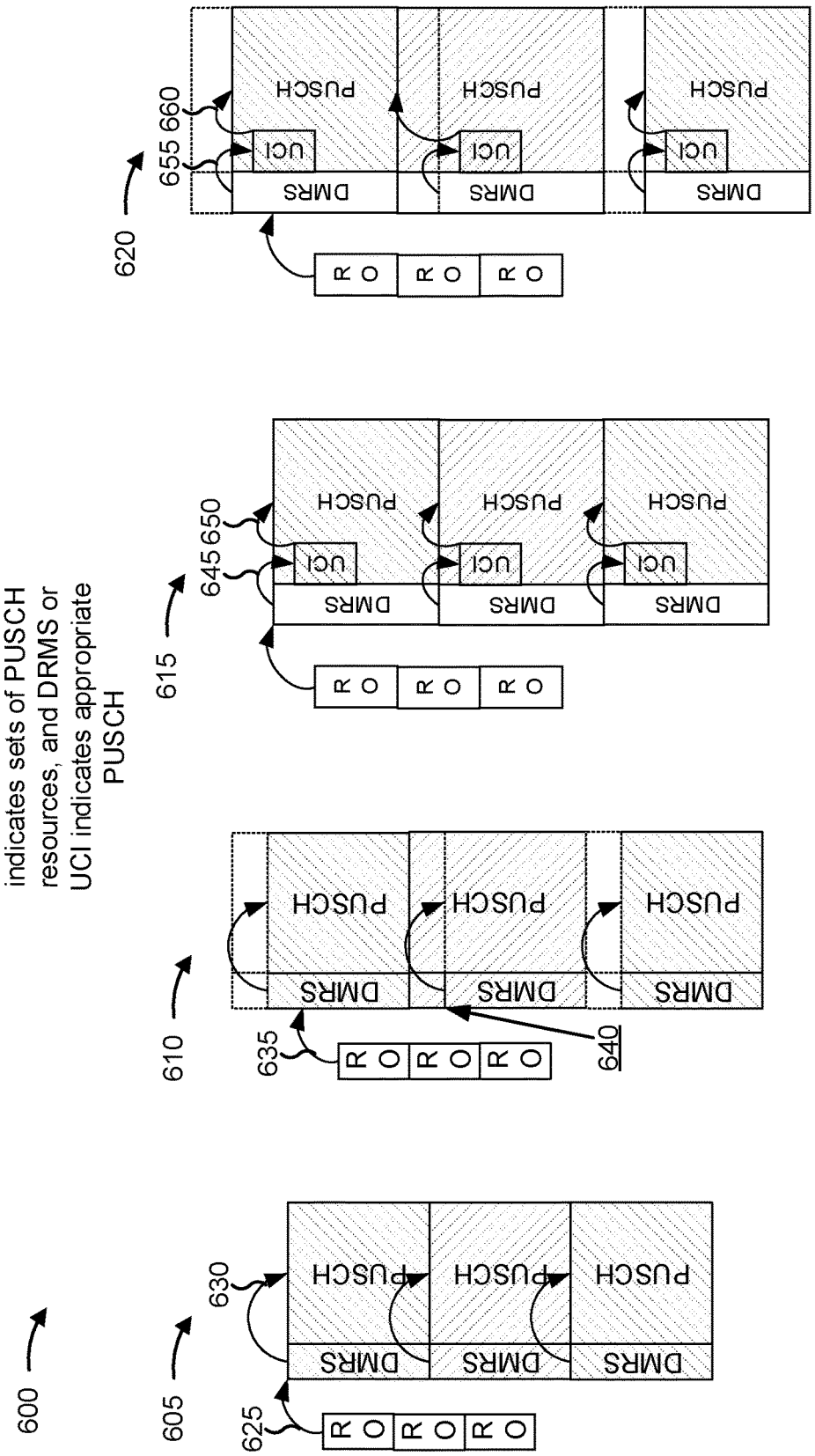
FIG. 6 is a diagram illustrating an example of signaling for variable payload size in a two-step RACH procedure, in accordance with various aspects of the present disclosure.

FIG. 6 is a diagram illustrating an example 600 of signaling for variable payload size in a two-step RACH procedure, in accordance with various aspects of the present disclosure. Example 600 depicts a third option (e.g., Option 3) for indication of the configuration of an uplink RACH message. In example 600, various ROs and/or preambles are mapped to sets of blind decoding hypotheses for a payload, and a DMRS or UCI of the uplink RACH message may indicate a payload size and/or a coding rate corresponding to one of the blind decoding hypotheses. In other words, the DMRS or the UCI may narrow the set of blind decoding hypotheses to be used by the BS 110.

In some aspects, the payload resources of different payload sizes may overlap, similarly to what is described in connection with reference number 520 of FIG. 5. In this case, the payload size control may be achieved by MCS selection. This is illustrated by examples 605 and 615, described in more detail below. In some aspects, the UCI and/or the DMRS may overlap for two or more different payloads. In this case, different resource allocations may be allocated for different sets of payloads, so that a UE can select different payload sizes based at least in part on a traffic level and/or the like. This is illustrated by examples 610 and 620, described in more detail below.

In some aspects, the coding rate of the payload may be indicated by a scrambling sequence of the DMRS. In this case, the BS 110 may attempt multiple scrambling hypotheses to detect the DMRS in order to determine the payload size. This is illustrated by examples 605 and 610, described in more detail below. In some aspects, the payload size may be indicated in the UCI. For example, the UCI may be piggybacked on the payload. This is illustrated by examples 615 and 620, described in more detail below. In this case, the BS 110 may perform channel estimation to decode the UCI. For example, the UCI piggybacking configuration may not depend on the payload size. In order to prevent this from occurring, the resource element calculation and modulation order for the payload may not depend on the MCS or the resource block allocation of the payload. For example, the BS 110 may use a worst case among all configured payloads to determine the resource element calculation and/or modulation order.

Example 605 illustrates an example wherein the resources for various payloads overlap and the coding rate for decoding the various payloads is indicated by the DMRS. As shown by reference number 625, the RO (and/or a preamble of the RO) may indicate a set of blind decoding hypotheses for the set of payloads. As shown by reference number 630, a DMRS (e.g., a scrambling sequence of the DMRS) may indicate an MCS of the corresponding payload. For example, DMRSs of the top and bottom payloads may be associated with scrambling sequences that indicate MCSs of the top and bottom payloads (indicated by the matching hatching), and a DMRS of the middle payload may be associated with a scrambling sequence that indicates an MCS of the middle payload. For example, the middle payload may be associated with a different payload size than the top or bottom payloads, so the middle payload may have a different MCS than the top or bottom payloads.

Example 610 illustrates an example wherein the DMRSs for different payloads can overlap, and wherein the payloads can be associated with differently-sized resource allocations. As shown by reference number 635, the RO (and/or a preamble of the RO) may indicate a set of blind decoding hypotheses for the payloads. As further shown, certain resource allocations (indicated by dotted borders) may be used for a first payload or a second payload. The UE 120 may indicate whether an overlapped resource allocation is to be used for a first payload or a second payload based at least in part on a DMRS of the overlapped resource allocation. For example, a DMRS of the overlapped resource allocation shown by reference number 640 is scrambled in accordance with the middle payload's DMRS, so the overlapped resource allocation is to be used for the middle payload rather than the top payload. This may provide for flexible usage of resource allocations so that payloads of different sizes can be provided using a same MCS, thereby reducing complexity and conserving modulation and demodulation resources.

Example 615 illustrates an example wherein the resource allocations of various payloads overlap, and wherein a UCI is used to indicate a size of a payload. As shown by reference number 645, the BS 110 may estimate the channel using the DMRS, and may decode a UCI based at least in part on the estimated channel. As shown by reference number 650, the UCI may indicate a coding rate (e.g., an MCS and/or the like) of the corresponding payload. For example, the UCI may indicate a coding rate of the payload on which the UCI is piggybacked. Thus, the BS 110 may determine the coding rate (and therefore the size) of the payload based at least in part on the UCI, and may decode the payload accordingly. In this way, a number of blind decoding hypotheses of the BS 110 is reduced, thereby conserving blind decoding resources.

Example 620 illustrates an example wherein the DMRS for different payloads can overlap, wherein the payloads can be associated with differently-sized resource allocations, and wherein a UCI is used to indicate the size of a resource allocation. As shown in example 620, and by reference number 655, the BS 110 may estimate the channel using the DMRS, and may identify the UCI based at least in part on estimating the channel. As shown by reference number 660, the UCI may indicate a size of the payload. For example, the UCI indicates a smaller size for the topmost payload and a larger size for the middle payload. In this way, a number of blind decoding hypotheses of the BS 110 is reduced, thereby conserving blind decoding resources.

As indicated above, FIG. 6 is provided as an example. Other examples may differ from what is described with respect to FIG. 6.

Figure 7:
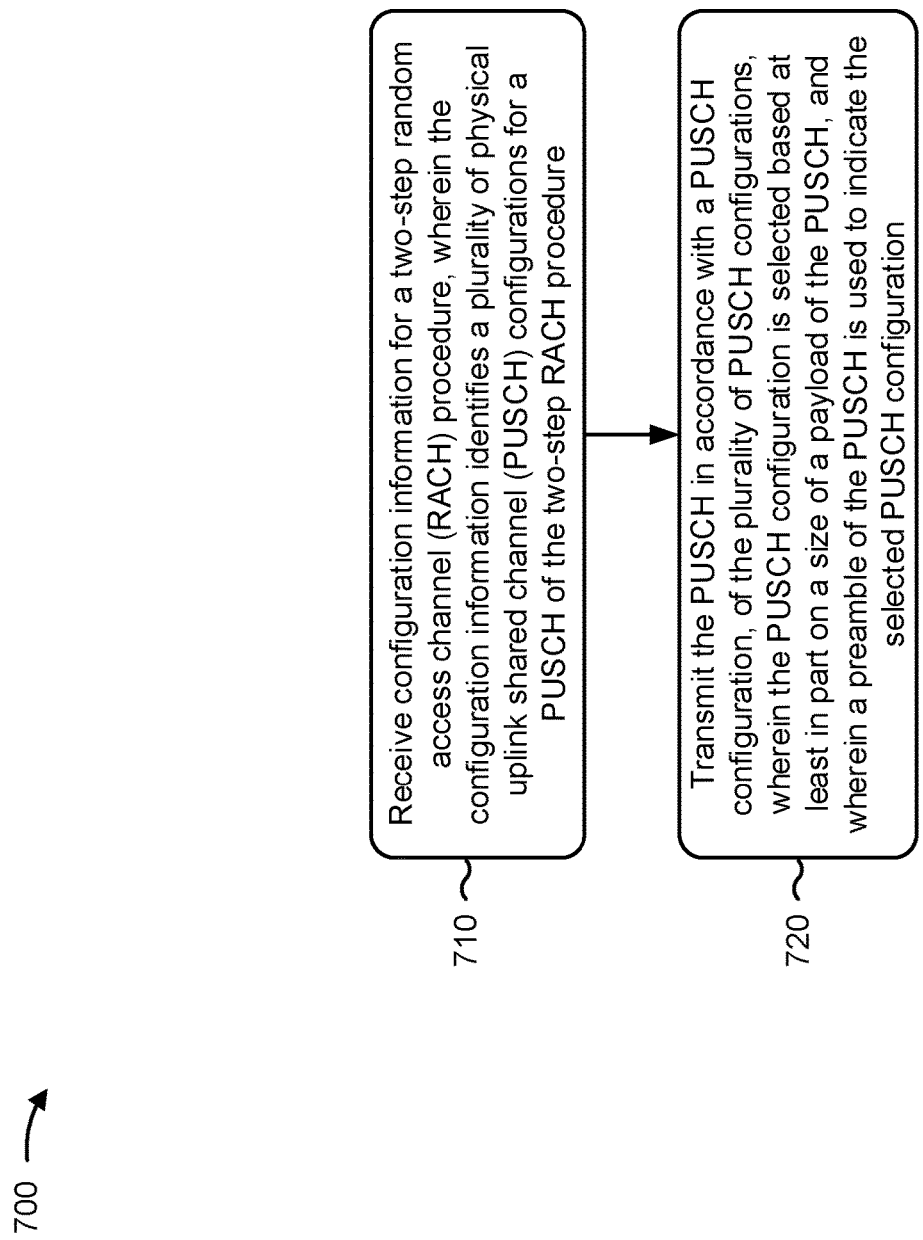
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs signaling for variable payload size for a two-step RACH procedure.

As shown in FIG. 7, in some aspects, process 700 may include receiving configuration information for a two-step RACH procedure, wherein the configuration information identifies a plurality of PUSCH configurations for a PUSCH of the two-step RACH procedure (block 710). For example, the UE (e.g., using antenna 252, DEMOD 254, MIMO detector 256, receive processor 258, controller/processor 280, and/or the like) may receive configuration information for a two-step RACH procedure. The configuration information may identify a plurality of PUSCH configurations for a PUSCH of the two-step RACH procedure.

As shown in FIG. 7, in some aspects, process 700 may include transmitting the PUSCH in accordance with a PUSCH configuration, of the plurality of PUSCH configurations, wherein the PUSCH configuration is selected based at least in part on a size of a payload of the PUSCH, and wherein a preamble of the PUSCH is used to indicate the selected PUSCH configuration (block 720). For example, the UE (e.g., using controller/processor 280, transmit processor 264, TX MIMO processor 266, MOD 254, antenna 252, and/or the like) may transmit the PUSCH in accordance with a PUSCH configuration of the plurality of PUSCH configurations. The PUSCH configuration may be selected based at least in part on a size of a payload of the PUSCH. A preamble of the PUSCH may be used to indicate the selected PUSCH configuration.

Process 700 may include additional aspects, such as any single aspect and/or any combination of aspects described below and/or in connection with one or more other processes described elsewhere herein.

In a first aspect, the preamble of the PUSCH indicates the size of the payload of the PUSCH. In a second aspect, alone or in combination with the first aspect, the UE transmits the PUSCH using a particular RACH occasion for the preamble of the PUSCH, wherein the particular RACH occasion indicates the size of the payload or a PUSCH configuration of the payload.

In a third aspect, alone or in combination with the first aspect and/or the second aspect, the preamble is associated with a first preamble group of a RACH occasion, and a second preamble group of the RACH occasion is configured to indicate a different size of the payload or a different PUSCH configuration than the first preamble group of the RACH occasion. In a fourth aspect, alone or in combination with one or more of the first through third aspects, the preamble of the PUSCH indicates a set of blind decoding hypotheses for the payload of the PUSCH. In a fifth aspect, alone or in combination with one or more of the first through fourth aspects, multiple blind decoding hypotheses are mapped to respective resource allocations in connection with the preamble. In a sixth aspect, alone or in combination with one or more of the first through fifth aspects, at least two resource allocations, of the respective resource allocations, have different sizes. In a seventh aspect, alone or in combination with one or more of the first through sixth aspects, multiple blind decoding hypotheses are mapped to a same resource allocation in connection with the preamble.

In an eighth aspect, alone or in combination with one or more of the first through seventh aspects, the PUSCH indicates a coding rate for the payload of the PUSCH or the size of the payload of the PUSCH. In a ninth aspect, alone or in combination with one or more of the first through eighth aspects, a set of resources for the payload is used for multiple different sizes of the payload, and the multiple different sizes are distinguished based at least in part on the coding rate for the payload. In a tenth aspect, alone or in combination with one or more of the first through ninth aspects, the coding rate is indicated using a demodulation reference signal scrambling sequence of the PUSCH. In an eleventh aspect, alone or in combination with one or more of the first through tenth aspects, the size of the payload is indicated using uplink control information of the PUSCH. In a twelfth aspect, alone or in combination with one or more of the first through eleventh aspects, the uplink control information is provided in the payload. In a thirteenth aspect, alone or in combination with one or more of the first through twelfth aspects, at least part of uplink control information or a demodulation reference signal of the PUSCH pertains to two or more different resource allocations for the payload of the PUSCH.

In a fourteenth aspect, alone or in combination with one or more of the first through thirteenth aspects, a resource element determination or a modulation order determination is performed based at least in part on a worst resource element determination or a worst modulation order determination of the plurality of PUSCH configurations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where a base station (e.g., BS 110) performs signaling for variable payload size for a two-step RACH procedure.

As shown in FIG. 8, in some aspects, process 800 may include transmitting configuration information for a two-step RACH procedure for a UE, wherein the configuration information identifies a plurality of PUSCH configurations for a PUSCH of the two-step RACH procedure (block 810). For example, the base station (e.g., using controller/processor 240, transmit processor 220, TX MIMO processor 230, MOD 232, antenna 234, and/or the like) may transmit configuration information for a two-step RACH procedure for a UE. The configuration information may identify a plurality of PUSCH configurations for a PUSCH of the two-step RACH procedure.

As shown in FIG. 8, in some aspects, process 800 may include receiving the PUSCH in accordance with a PUSCH configuration, of the plurality of PUSCH configurations, wherein the PUSCH comprises a preamble that indicates the PUSCH configuration of the plurality of PUSCH configurations used for communicating with the PUSCH; and determining the PUSCH configuration based on the preamble (block 820). For example, the base station (e.g., using antenna 234, DEMOD 232, MIMO detector 236, receive processor 238, controller/processor 240, and/or the like) may receive the PUSCH in accordance with a PUSCH configuration of the plurality of PUSCH configurations. The PUSCH configuration may be selected by a US based at least in part on a size of a payload of the PUSCH. A preamble of the PUSCH may be used to indicate the PUSCH configuration to the base station.

Process 800 may include additional aspects, such as any single aspect and/or any combination of aspects described below and/or in connection with one or more other processes described elsewhere herein.

In a first aspect, the preamble of the PUSCH indicates the size of the payload of the PUSCH. In a second aspect, alone or in combination with the first aspect, the base station may receive the PUSCH in a particular RACH occasion, wherein the particular RACH occasion indicates the size of the payload or a PUSCH configuration of the payload.

In a third aspect, alone or in combination with one or more of the first and second aspects, the preamble is associated with a first preamble group of a RACH occasion, and a second preamble group of the RACH occasion is configured to indicate a different size or PUSCH configuration of the payload than the first preamble of the RACH occasion. In a fourth aspect, alone or in combination with one or more of the first through third aspects, the preamble of the PUSCH indicates a set of blind decoding hypotheses for receiving the payload of the PUSCH. In a fifth aspect, alone or in combination with one or more of the first through fourth aspects, multiple blind decoding hypotheses are mapped to respective resource allocations in connection with the preamble. In a sixth aspect, alone or in combination with one or more of the first through fifth aspects, at least two resource allocations, of the respective resource allocations, have different sizes. In a seventh aspect, alone or in combination with one or more of the first through sixth aspects, multiple blind decoding hypotheses are mapped to a same resource allocation in connection with the preamble. In an eighth aspect, alone or in combination with one or more of the first through seventh aspects, the base station may perform blind decoding in accordance with the set of blind decoding hypotheses to receive the payload of the PUSCH.

In a ninth aspect, alone or in combination with one or more of the first through eighth aspects, the PUSCH indicates a coding rate for the payload of the PUSCH or the size of the payload of the PUSCH. In a tenth aspect, alone or in combination with one or more of the first through ninth aspects, a set of resources for the payload is used for multiple different sizes of the payload, and the multiple different sizes are distinguished based at least in part on the coding rate for the payload. In an eleventh aspect, alone or in combination with one or more of the first through tenth aspects, the coding rate is indicated using a demodulation reference signal scrambling sequence of the PUSCH. In a twelfth aspect, alone or in combination with one or more of the first through eleventh aspects, the size of the payload is indicated using uplink control information of the PUSCH. In a thirteenth aspect, alone or in combination with one or more of the first through twelfth aspects, the uplink control information is received in the payload. In a fourteenth aspect, alone or in combination with one or more of the first through thirteenth aspects, at least part of uplink control information or a demodulation reference signal of the PUSCH pertains to two or more different resource allocations for the payload of the PUSCH. In a fifteenth aspect, alone or in combination with one or more of the first through fourteenth aspects, a resource element determination or a modulation order determination is performed based at least in part on a worst resource element determination or a worst modulation order determination of the plurality of PUSCH configurations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving configuration information for a two-step random access channel (RACH) procedure,
        wherein the configuration information identifies a plurality of physical uplink shared channel (PUSCH) configurations for a PUSCH of the two-step RACH procedure; and
    transmitting the PUSCH in accordance with a PUSCH configuration, of the plurality of PUSCH configurations, wherein the PUSCH configuration is selected based at least in part on a payload size of an uplink RACH message, and wherein a preamble of the PUSCH is used to indicate the selected PUSCH configuration.

2. The method of claim 1, wherein the preamble of the PUSCH indicates the payload size of the uplink RACH message.

3. The method of claim 1, wherein transmitting the PUSCH in accordance with the PUSCH configuration comprises:
    transmitting the PUSCH using a particular RACH occasion for the preamble of the PUSCH, wherein the particular RACH occasion indicates the payload size of the uplink RACH message or a PUSCH configuration of a payload of the uplink RACH message.

4. The method of claim 1, wherein the preamble is associated with a first preamble group of a RACH occasion, and wherein a second preamble group of the RACH occasion is configured to indicate a different payload size of the uplink RACH message or a different PUSCH configuration than the first preamble group of the RACH occasion.

5. The method of claim 1, wherein the preamble of the PUSCH indicates a set of blind decoding hypotheses for a payload of the uplink RACH message.

6. The method of claim 5, wherein multiple blind decoding hypotheses are mapped to respective resource allocations in connection with the preamble.

7. The method of claim 6, wherein at least two resource allocations, of the respective resource allocations, have different sizes.

8. The method of claim 5, wherein multiple blind decoding hypotheses are mapped to a same resource allocation in connection with the preamble.

9. A method of wireless communication performed by a base station, comprising:
transmitting configuration information for a two-step random access channel (RACH) procedure for a user equipment (UE),
wherein the configuration information identifies a plurality of physical uplink shared channel (PUSCH) configurations for an uplink RACH message of the two-step RACH procedure;
receiving the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and
determining the PUSCH configuration based at least in part on the preamble and a payload size of the uplink RACH message.

10. The method of claim 9, wherein the preamble of the PUSCH indicates the payload size of the uplink RACH message.

11. The method of claim 9, wherein receiving the PUSCH in accordance with the PUSCH configuration comprises:
receiving the PUSCH in a particular RACH occasion, wherein the particular RACH occasion indicates the payload size of the uplink RACH message or the PUSCH configuration of a payload of the uplink RACH message.

12. The method of claim 9, wherein the preamble is associated with a first preamble group of a RACH occasion, and wherein a second preamble group of the RACH occasion is configured to indicate a different payload size of the uplink RACH message or PUSCH configuration of a payload of the uplink RACH message than the first preamble group of the RACH occasion.

13. The method of claim 9, wherein the preamble of the PUSCH indicates a set of blind decoding hypotheses for receiving a payload of the uplink RACH message.

14. The method of claim 13, wherein multiple blind decoding hypotheses are mapped to respective resource allocations in connection with the preamble.

15. The method of claim 14, wherein at least two resource allocations, of the respective resource allocations, have different sizes.

16. The method of claim 13, wherein multiple blind decoding hypotheses are mapped to a same resource allocation in connection with the preamble.

17. The method of claim 13, further comprising:
performing blind decoding in accordance with the set of blind decoding hypotheses to receive a payload of the uplink RACH message.

18. A user equipment (UE) for wireless communication, comprising:
a memory; and
one or more processors coupled to the memory, the memory and the one or more processors configured to:
receive configuration information for a two-step random access channel (RACH) procedure,
wherein the configuration information identifies a plurality of physical uplink shared channel (PUSCH) configurations for a PUSCH of the two-step RACH procedure; and
transmit the PUSCH in accordance with a PUSCH configuration, of the plurality of PUSCH configurations, wherein the PUSCH configuration is selected based at least in part on a payload size of an uplink RACH message, and wherein a preamble of the PUSCH is used to indicate the selected PUSCH configuration.

19. The UE of claim 18, wherein the preamble of the PUSCH indicates the payload size of the uplink RACH message.

20. The UE of claim 18, wherein the one or more processors, when transmitting the PUSCH in accordance with the PUSCH configuration, are further configured to:
transmit the PUSCH using a particular RACH occasion for the preamble of the PUSCH, wherein the particular RACH occasion indicates the payload size of the uplink RACH message or a PUSCH configuration of a payload of the uplink RACH message.

21. The UE of claim 18, wherein the preamble is associated with a first preamble group of a RACH occasion, and wherein a second preamble group of the RACH occasion is configured to indicate a different payload size of the uplink RACH message or a different PUSCH configuration than the first preamble group of the RACH occasion.

22. The UE of claim 18, wherein the preamble of the PUSCH indicates a set of blind decoding hypotheses for a payload of the uplink RACH message.

23. The UE of claim 22, wherein multiple blind decoding hypotheses are mapped to respective resource allocations in connection with the preamble.

24. The UE of claim 23, wherein at least two resource allocations, of the respective resource allocations, have different sizes.

25. The UE of claim 22, wherein multiple blind decoding hypotheses are mapped to a same resource allocation in connection with the preamble.

26. A non-transitory computer-readable medium storing one or more instructions for wireless communication, the one or more instructions comprising:
one or more instructions that, when executed by one or more processors of a base station, cause the one or more processors to:
transmit configuration information for a two-step random access channel (RACH) procedure for a user equipment (UE),
wherein the configuration information identifies a plurality of physical uplink shared channel (PUSCH) configurations for an uplink RACH message of the two-step RACH procedure;
receive the PUSCH in accordance with a PUSCH configuration, of the plurality of PUSCH configurations, wherein the PUSCH comprises a preamble that indicates the PUSCH configuration of the plurality of PUSCH configurations used for communicating the PUSCH; and
determine the PUSCH configuration based at least in part on the preamble and a payload size of the uplink RACH message.

27. The non-transitory computer-readable medium of claim 26, wherein the preamble of the PUSCH indicates the payload size of the uplink RACH message.

28. The non-transitory computer-readable medium of claim 26, wherein the one or more processors, when receiving the PUSCH in accordance with the PUSCH configuration, are configured to:
   receive the PUSCH in a particular RACH occasion, wherein the particular RACH occasion indicates the payload size of the uplink RACH message or the PUSCH configuration of a payload of the RACH message.

29. The non-transitory computer-readable medium of claim 26, wherein the preamble is associated with a first preamble group of a RACH occasion, and wherein a second preamble group of the RACH occasion is configured to indicate a different payload size of the uplink RACH message or PUSCH configuration of a payload of the uplink RACH message than the first preamble group of the RACH occasion.

30. The non-transitory computer-readable medium of claim 26, wherein the preamble of the PUSCH indicates a set of blind decoding hypotheses for receiving a payload of the uplink RACH message.

\* \* \* \* \*